US012291884B2

(12) United States Patent
Brauer et al.

(10) Patent No.: US 12,291,884 B2
(45) Date of Patent: May 6, 2025

(54) SYSTEMS, DEVICES, AND METHODS FOR AN ELEVATOR PIT DECK DEVICE

(71) Applicants: Craig Brauer, Scarborough (CA); Mark Duggan, Orillia (CA)

(72) Inventors: Craig Brauer, Scarborough (CA); Mark Duggan, Orillia (CA)

( * ) Notice: Subject to any disclaimer, the term of this patent is extended or adjusted under 35 U.S.C. 154(b) by 10 days.

(21) Appl. No.: 18/224,703

(22) Filed: Jul. 21, 2023

(65) Prior Publication Data

US 2025/0027326 A1 Jan. 23, 2025

(51) Int. Cl.

| | |
|---|---|
| ***E04G 1/36*** | (2006.01) |
| ***B66B 5/00*** | (2006.01) |
| ***B66B 7/00*** | (2006.01) |
| ***E04G 3/28*** | (2006.01) |

(52) U.S. Cl.

CPC .............. *E04G 3/28* (2013.01); *B66B 5/0087* (2013.01); *B66B 7/00* (2013.01); *E04G 1/367* (2013.01)

(58) Field of Classification Search

CPC .......... E04G 1/367; E04G 3/28; B66B 5/0087

See application file for complete search history.

(56) References Cited

U.S. PATENT DOCUMENTS

| | | | | |
|---|---|---|---|---|
| 3,601,220 A * | 8/1971 | Saucier | E02F 9/00 | 182/84 |
| 4,280,243 A * | 7/1981 | Durrant | B65G 69/2835 | 14/71.1 |
| 6,003,630 A * | 12/1999 | Whalen | E04G 5/067 | 248/235 |
| 6,446,752 B2 * | 9/2002 | Philippe | E04G 1/20 | 182/150 |
| 6,494,291 B2 * | 12/2002 | Ono | E04G 5/04 | 182/150 |
| 6,533,069 B1 * | 3/2003 | Couillard | E06C 7/48 | 182/83 |
| 11,203,872 B2 * | 12/2021 | Hilgendorf | E04F 11/062 | |
| 11,518,651 B2 * | 12/2022 | Garbers | B66B 5/0081 | |
| 2001/0022253 A1 * | 9/2001 | Reuter | B66B 5/005 | 187/254 |
| 2005/0139421 A1 * | 6/2005 | Stingl | E04G 1/367 | 182/82 |
| 2016/0130115 A1 * | 5/2016 | Blaska | B66B 5/0087 | 187/401 |

(Continued)

FOREIGN PATENT DOCUMENTS

| | | | |
|---|---|---|---|
| CN | 106829663 A * | 6/2017 | B66B 13/301 |
| FR | 2641018 A1 * | 6/1990 | |

(Continued)

*Primary Examiner* — Michael A Riegelman

(74) *Attorney, Agent, or Firm* — Heer Law; Stephano Salani

(57) ABSTRACT

A deck device and a method to access a pit ladder are described. An elevator pit deck device includes a platform configured to move between a stored position and an operational position; the platform installable in a channel; the stored position being a folded or retracted configuration; the platform, when in the operational position, extending between a channel opening and a wall of the channel. In some embodiments, the channel is an elevator hoistway, the channel opening connects the elevator hoistway and an elevator landing sill, the wall of the channel is proximate to a pit ladder, and the pit ladder is extendable towards a pit of the elevator.

5 Claims, 6 Drawing Sheets

(56) References Cited

U.S. PATENT DOCUMENTS

| | | | | |
|---|---|---|---|---|
| 2020/0039786 | A1 * | 2/2020 | Kamada | B66B 11/0005 |
| 2020/0232235 | A1 * | 7/2020 | Garbers | E04G 1/367 |

FOREIGN PATENT DOCUMENTS

| | | | | | |
|---|---|---|---|---|---|
| KR | 102373661 | B1 * | 3/2022 | | |
| KR | 20230000067 | A * | 1/2023 | | |
| WO | WO-2010056202 | A1 * | 5/2010 | | B66B 19/00 |

* cited by examiner

SYSTEMS, DEVICES, AND METHODS FOR AN ELEVATOR PIT DECK DEVICE

FIELD

The present specification relates generally to elevator apparatuses and methods and specifically to systems, devices, and methods for an elevator pit deck device.

BACKGROUND

Elevator maintenance often requires access to the elevator pit. Due to the great depth of the elevator pit, the use of a pit ladder is used to descend the elevator pit.

SUMMARY

In accordance with an aspect, there is provided a deck device, including: a platform configured to move between a stored position and an operational position; the platform installable in a channel; the stored position being a folded or retracted configuration; the platform, when in the operational position, extending between a channel opening and a wall of the channel.

In some embodiments, the channel is an elevator hoistway, the channel opening connects the elevator hoistway and an elevator landing sill, the wall of the channel is proximate to a pit ladder, and the pit ladder is extendable towards a pit of the elevator.

In some embodiments, the platform is installed below an elevator car in the elevator hoistway.

In some embodiments, the platform, when unfolded, connects the elevator landing sill and the wall, the wall attached to the pit ladder; and wherein the foldable platform, when folded, functions as an elevator fascia.

In some embodiments, the platform is moved between the stored position and the operational position via remote control.

In some embodiments, the platform is moved between the stored position and the operational position via a key switch located outside the elevator.

In some embodiments, the platform is moved between the stored position and the operational position via a software application installed at an electronic device.

In some embodiments, the distance between the platform and the floor of the pit of the elevator is adjustable.

In some embodiments, activation of a control of the deck device disables operation of the elevator.

In accordance with an aspect, the deck device further includes: at least one light positioned near the perimeter of the platform; at least one guardrail positioned near the perimeter of the platform; a communications unit; a switch configured for controlling movement of the deck device via the communications unit; and an alarm unit.

In accordance with an aspect, there is provided a method for accessing a pit ladder, the method including: disabling operation of an elevator car in an elevator hoistway; and moving a platform of a pit deck device between a stored position and an operational position in the elevator hoistway; the stored position being a folded or retracted configuration that allows the pit deck device to function as an elevator fascia; the platform, when in the operational position, extending between an elevator landing sill and an elevator wall proximate the pit ladder.

In some embodiments, the platform is installed below the elevator car in the elevator hoistway.

In some embodiments, the platform is moved between the stored position and the operational position via remote control.

In some embodiments, the platform is moved between the stored position and the operational position via a key switch located outside the elevator.

In some embodiments, the platform is moved between the stored position and the operational position via a software application installed at an electronic device.

In some embodiments, the method further includes adjusting the distance between the platform and a floor of a pit of the elevator.

In some embodiments, disabling operation of the elevator car is by activation of a control of the deck device.

In some embodiments, the method further includes, while moving the platform between the stored position and the operational position: actuating at least one light positioned near a perimeter of the platform; and actuating an alarm.

In accordance with an aspect, an elevator pit deck system includes: an elevator hoistway; a pit ladder installable at a wall of the elevator hoistway; and a pit deck device configured to move between a stored position as an elevator fascia of the elevator hoistway and an operational position extending between the pit ladder and an elevator landing sill.

In some embodiments, the pit deck device comprises a communications unit configured to actuate movement of the pit deck device following receipt of a signal from a remote control, a switch, or a software application.

Other aspects and features according to the present application will become apparent to those ordinarily skilled in the art upon review of the following description of embodiments of the invention in conjunction with the accompanying figures.

BRIEF DESCRIPTION OF THE FIGURES

The principles may better be understood with reference to the accompanying figures provided by way of illustration of an exemplary embodiment, or embodiments, incorporating principles and aspects of embodiments, and in which.

DETAILED DESCRIPTION OF EMBODIMENTS

Figure 1:
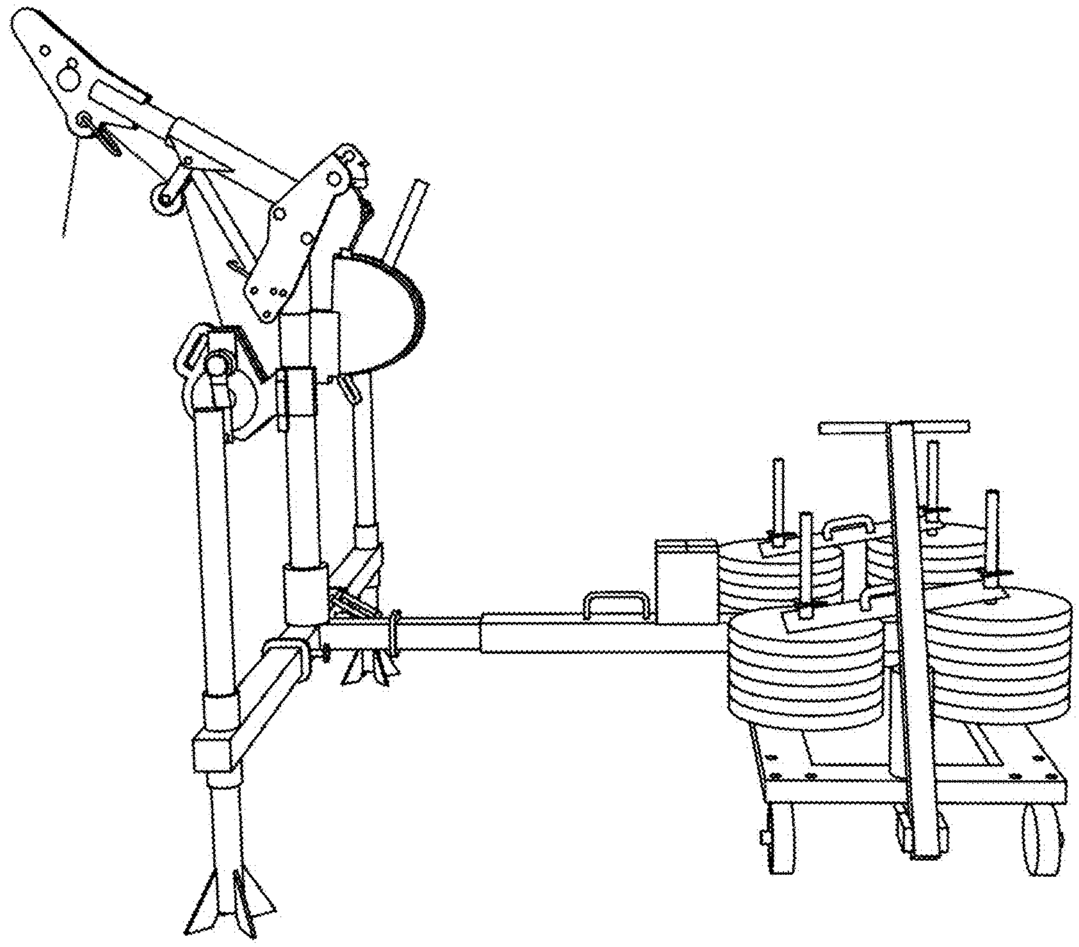
FIG. 1 is a perspective view of a counterweight hire system.

The description that follows, and the embodiments described therein, are provided by way of illustration of an example, or examples, of particular embodiments. These examples are provided for the purposes of explanation, and not of limitation. In the description, like parts are marked throughout the specification and the drawings with the same respective reference numerals. The drawings are not necessarily to scale and in some instances, proportions may have been exaggerated in order more clearly to depict certain features.

In many places, the pit ladder is required by elevator code and is installed in every elevator pit. Pit ladders are located within the elevator hoistway, on an inner wall adjacent to the landing sill. Existing pit ladders can be used on single slide doors. Due to the distance between the landing sill and pit ladder, a maintenance user may find reaching for the pit ladder when standing on the landing sill challenging. Access to elevator pits is necessary to do regular maintenance and inspections. Many existing pit ladders are located 24"-48" and more from the open door on centre parting elevator doors, regardless of pit depth. This creates a fall hazard to the professionals entering and exiting hoist way and pits. Embodiments described herein can improve the ease of access to the pit ladder from the landing sill and can provide safe access to the existing pit ladder, reduce the required manpower, and eliminate exposed fall hazards while accessing the pit ladder.

Products available require a crew of two or more users; they are cumbersome; require storage when not in use; are time consuming to install; require storage; leave an exposed hazard; will not open doors even with barricades; and open the hoistway on multiple floors, leaving the public at risk. Users can be technicians, such as maintenance technicians or service or operations technicians.

As other examples, a drawing rope can be used that loops around one end of the pit ladder and draws the pit ladder close to and under the landing sill. A hooking rod to engage the pit ladder or a pit ladder with a cam and roller mechanism can be used. Alternatively, a user, while wearing a harness, can crawl along the walls adjacent to the landing sill, within the elevator hoistway, to reach the pit ladder. These methods are unsafe because users risk falling into the elevator pit while reaching for the pit ladder. Further, these methods are costly and inefficient because they require the entire elevator hoistway to be blocked off by a counterweight hire system which involves a minimum of two to three maintenance users and the use of two floors worth of space.

Figure 4:
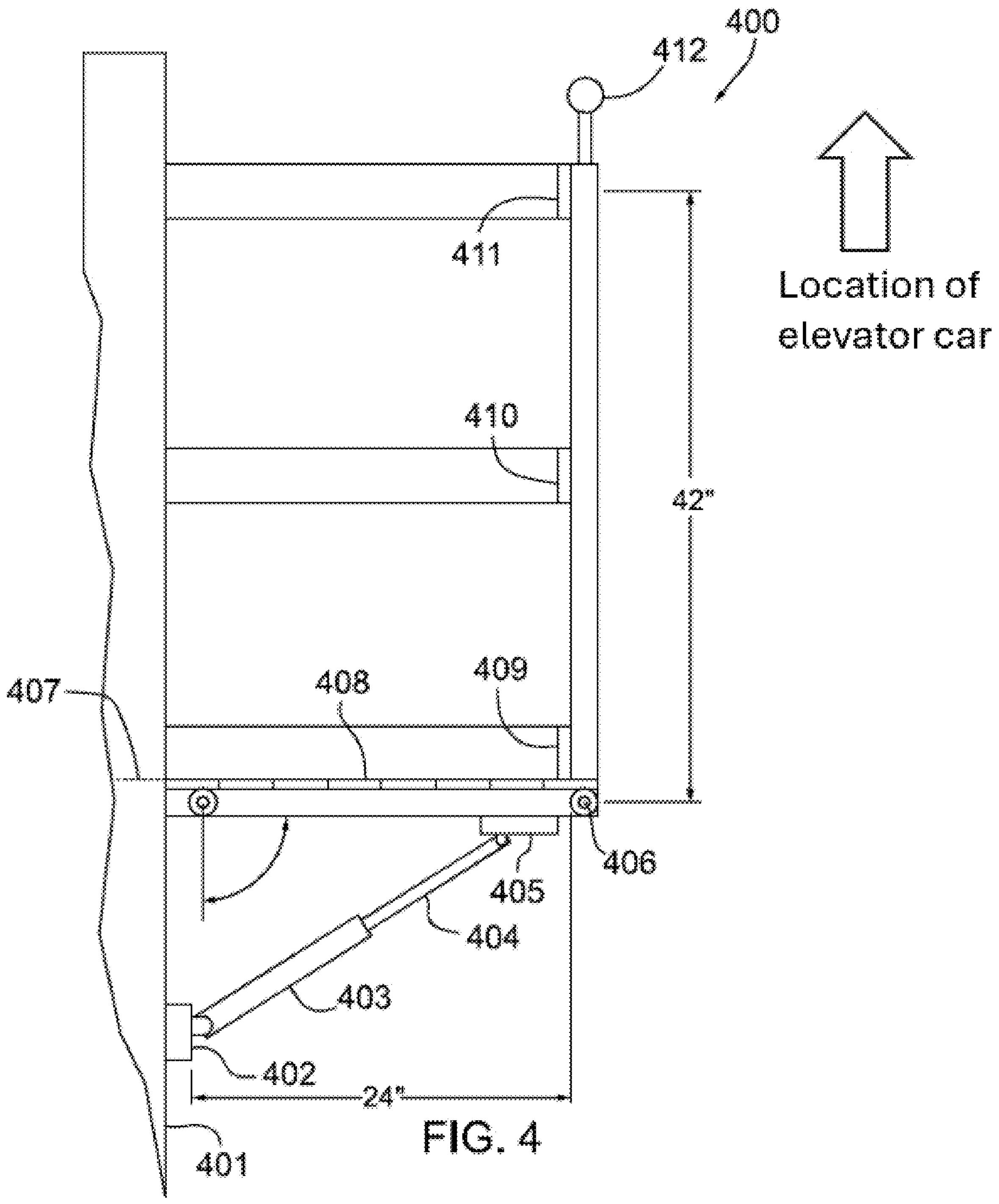
FIG. 4 shows an end view of a pit deck device.

FIG. 4 shows an example pit deck device 400 according to some embodiments. Pit deck device 400 is shown from an end view standing on a pit floor in front of a pit ladder, where pit deck device 400 is installed above the pit floor above the bottom of an elevator shaft, according to some embodiments. In some embodiments, pit deck device 400 at elevator sill 407 and pit wall 401 includes flashing light 412, top railing 411, mid railing 410, bottom railing 409, pivot point 406, platform 408, mounting plate 405, two hydraulic pistons 404, two hydraulic cylinders 403, and mounting bracket 402. Top railing 411, mid railing 410, and bottom railing 409 together form the end railings. Also shown are left top railing, left mid railing, and left bottom railing. In some embodiments, instead of or in addition to one or more hydraulic pistons 404 and one or more hydraulic cylinders 403, pit deck device 400 includes an actuator. Flashing light 412 is a flashing red light when pit deck device 400 is in operation (up/down movement) and a solid green light when in secured position. In some embodiments, top railing 411 is 42" high, mid railing 410 is 22" high, and bottom railing is a 4" kick plate. In some embodiments, top railing 411 and mid railing 410 are 2" by 2" aluminum tubing. As shown, the distance from top railing 411 to platform 408 is 42" in some embodiments. As shown, the width of platform 408 is 24". As shown by the arrow, platform 408 can move in two directions, up and down, according to the directionality of the arrows. Platform 408 is aluminum and/or steel, according to some embodiments. In some embodiments, platform 408 has an overall length of 48", which is 42" spanning a 42" elevator door opening and 6" extending to the pit ladder. Other materials and/or dimensions and distances of the foregoing can be used according to various embodiments.

Figure 5:
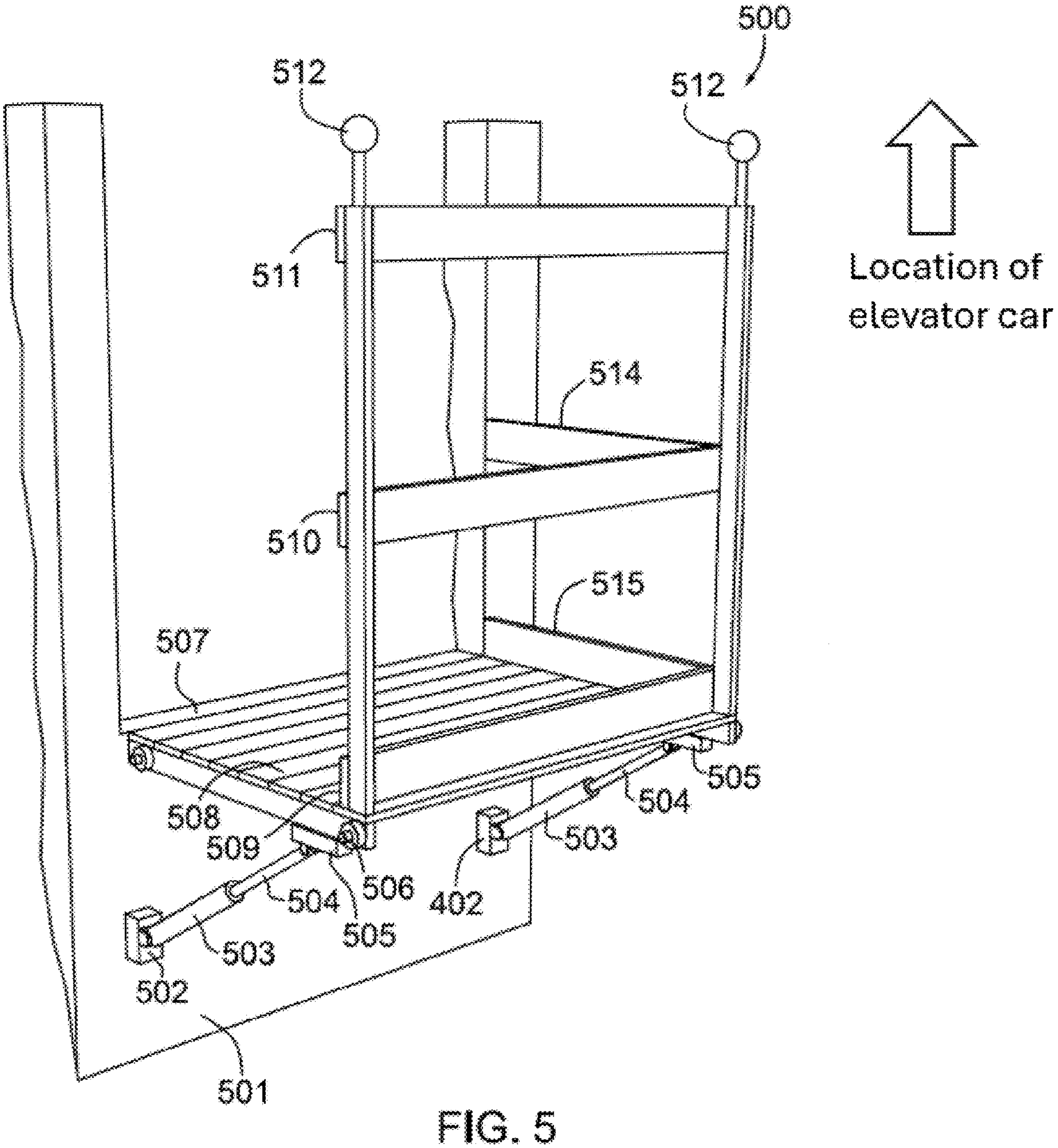
FIG. 5 shows a perspective view of a pit deck device.
Figure 6:
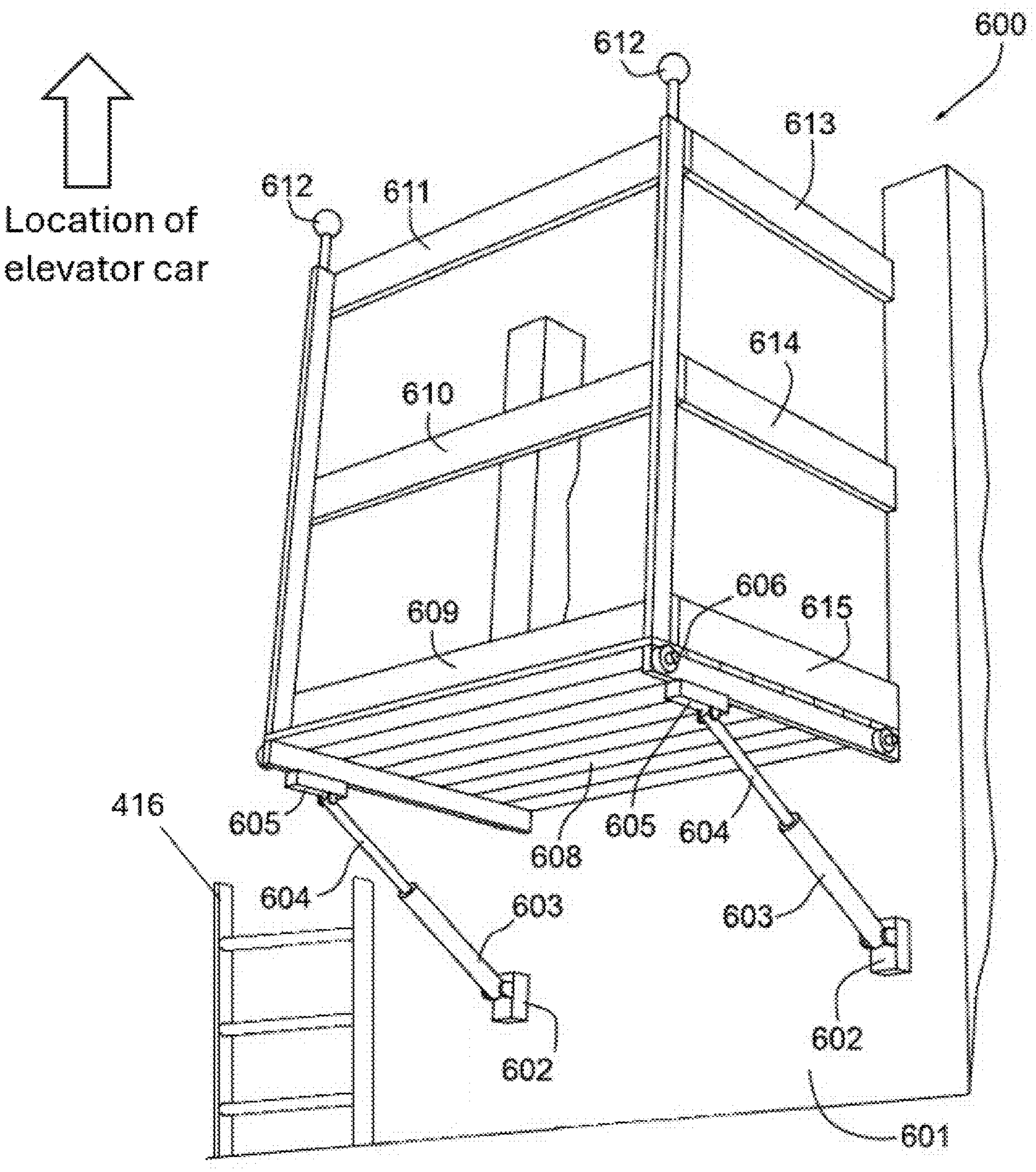
FIG. 6 shows a perspective view of a pit deck device.

FIG. 5 shows an example pit deck device 500 according to some embodiments. Pit deck device 500 is shown from a perspective view at a door opening where pit deck device 500 is installed, according to some embodiments. In some embodiments, pit deck device 500 at elevator sill 507 and pit wall 501 includes flashing light 512, top railing 511, mid railing 510, bottom railing 509, pivot point 506, platform 508, mounting plate 505, two hydraulic pistons 504, two hydraulic cylinders 503, mounting bracket 502, left top railing, left mid railing 514, and left bottom railing 515. Top railing 511, mid railing 510, and bottom railing 509 together form the end railings. In some embodiments, instead of or in addition to one or more hydraulic pistons 504 and one or more hydraulic cylinders 503, pit deck device 500 includes an actuator. In some embodiments, pit deck device 500 can be dimensioned and configured similarly as described in respect of pit deck device 400. FIG. 6 shows an example pit deck device 600 according to some embodiments. Pit deck device 500 is shown from a bottom perspective view at a door opening where pit deck device 600 is installed, according to some embodiments. In some embodiments, pit deck device 600 at elevator sill and pit wall 601 includes flashing light(s) 612, top railing 611, mid railing 610, bottom railing 609, pivot point 606, platform 608, mounting plate 605, two hydraulic pistons 604, two hydraulic cylinders 603, mounting bracket 602, left top railing 613, left mid railing 614, and left bottom railing 615. Top railing 611, mid railing 610, and bottom railing 609 together form the end railings. In some embodiments, instead of or in addition to one or more hydraulic pistons 604 and one or more hydraulic cylinders 603, pit deck device 600 includes an actuator. In some embodiments, pit deck device 600 can be dimensioned and configured similarly as described in respect of pit deck device 400. In some embodiments, one or more flashing light(s) 612 are omitted.

As shown, right side of pit deck device 600 does not have railings. For example, this is at the side that is oriented towards pit ladder such that the pit deck device 600 remains open to access the pit ladder 416. This can allow for a user to access the pit ladder. Left railings 613, 614, and 615 help prevent a user from falling off pit deck device 600.

Other embodiments of pit deck device will now be described in reference to pit deck device 400, but with modifications as described. In some embodiments, a self-contained unit providing safer access to a pit ladder 416 is provided. According to some embodiments such as shown in FIGS. 4, 5, and/or 6, a pit deck device 400 is located within the elevator hoistway below the elevator car. The pit deck device 400 includes a retractable or foldable platform 408. In the stored position, the platform 408 is positioned parallel to the elevator fascia 401 or in the alternative, can function as the elevator fascia or can replace the elevator fascia. The platform 408 can be moved by either an actuator or hydraulic cylinder(s) 403, according to various embodiments. A user can choose the method of operation in some embodiments. For example, the platform 408 can be activated by a low voltage (e.g., 24 volts) actuator in some embodiments. As another example, the platform 408 can be activated by hydraulic cylinder(s) 403 in some embodiments. In some embodiments, only one method of operation is included. In some embodiments, both are included, such that, for example, if the hydraulics fail, the actuator can still be used to operate the platform and/or vice versa.

In the stored position of the platform, there is enough distance between the landing sill 407 and the elevator car such that the elevator is fully operational without the need to disassemble the pit deck device. Pit deck device 400 does not require additional external storage to house it. In the operational position of pit deck device, the platform 408 can be unfolded or extended. In the operational position, the platform 408 connects the landing sill 407 to the pit ladder. Duringn operation, the landing doors of the elevator can be maintained in a closed position and this can provide safety to the public while a user accesses the elevator pit. In some embodiments, the pit deck device 400 also includes perimeter safety lights located on and/or around or near the platform 408. The floor of the platform 408 may be constructed from steel with an anti-slip diamond plate atop or other suitable material. In some embodiments, the platform 408 has a rated capacity of 500 lbs and a 5:1 safety factor. In some embodiments, the platform 408 has a rated capacity of 1000 lbs and a 5:1 safety factor. In some embodiments, the platform 408 has a different rated capacity and safety factor. In some embodiments, the pit deck device 400 also includes guardrails 411, 410, 409 along the perimeter of the platform 408 and this can help prevent a maintenance user from falling off the platform into the elevator pit. The dimensions of the pit deck device 400 can be configured based on the size of the landing door of the elevator. In some embodiments, the pit deck device 400 also includes one or more safety switches that when activated, prevent the elevator car from moving up and down the elevator hoistway.

In some embodiments, as shown in FIGS. 4, 5, and 6, the pit deck device 400 runs on a power supply independent of the elevator operating system. The power supply can be battery-based (e.g., 12 Volt DC operation) or linear actuator-based. In some embodiments, the pit deck device 400 includes a wireless Bluetooth communication system. The pit deck device 400 is operated via remote control (e.g., via a physical device or an application on an electronic device) or a key switch located in the hallways, external to the elevator, which can communicate with the pit deck device via a wireless Bluetooth communication system or other communication system. The distance between pit deck device 400 and the pit floor is adjustable, such as by remote control, a key switch, or a device located at the pit deck.

In some embodiments, as shown in FIGS. 4, 5, and 6, a user follows a series of steps to access the pit ladder. First, the user gains control of the elevator and place the elevator on hoistway access mode to move the elevator car above the first floor per directions from the elevator manufacturer's technical and safety guidelines. Alternatively, the user can move the elevator car a distance in the elevator, the distance being sufficient to allow access to the pit deck device installed in the elevator. In some embodiments, control of pit deck device 400 is independent of control of the elevator system. For example, when pit deck device controls are used, or at any time the pit deck device is not in a stored position, the elevator operation is triggered to fail, according to some embodiments. For example, the elevator car will stop moving.

Second, the user unfolds the pit deck device 400. This can be following close of the elevator doors partway, such as with a 100 cm opening. The unfolding of the pit deck device 400 can be via the use of a remote control or a key switch located in the hallways, external to the elevator, or by setting a virtual pit deck switch in a software application in the "up" direction. A signal is sent such as via a wireless or Bluetooth communication system or other communication system and, the pit deck device 400 moves from its stored position to its operational position. The pit deck device 400 is unfolded from its stored position to its operational position, according to some embodiments. As the pit deck device 400 unfolds, in some embodiments, a red flashing light 412 will be activated and/or an audible alarm sounds. The pit deck device 400 also includes a safety switch, which is connected to the elevator safety circuit, that disables the operation of the elevator during the unfolding of the pit deck device, according to some embodiments.

Third, once the pit deck device 400 is in the operational position (e.g., completely unfolded), the red flashing light 412 stops and a continuous green light is activated in its place. This can signal to the user that the pit deck device is safe for use. The user may walk with both feet on the platform 408 of the pit deck device 400 towards the pit ladder and may utilize the guardrails (end railings and/or left railings) to afford themselves greater stability while travelling along on the platform 408 of the pit deck device 400. The user can secure a non-ladder end rail from the pit deck device before walking on the pit deck.

Figure 2:
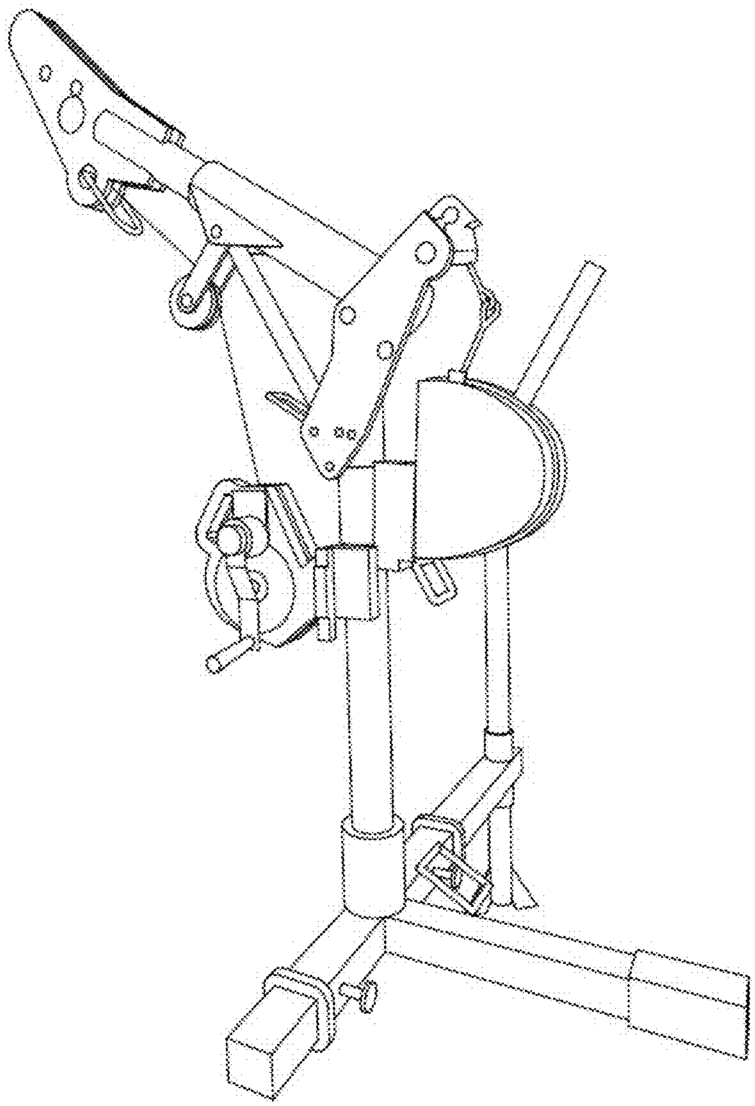
FIG. 2 shows a portion of the counterweight hire system of FIG. 1.
Figure 3:
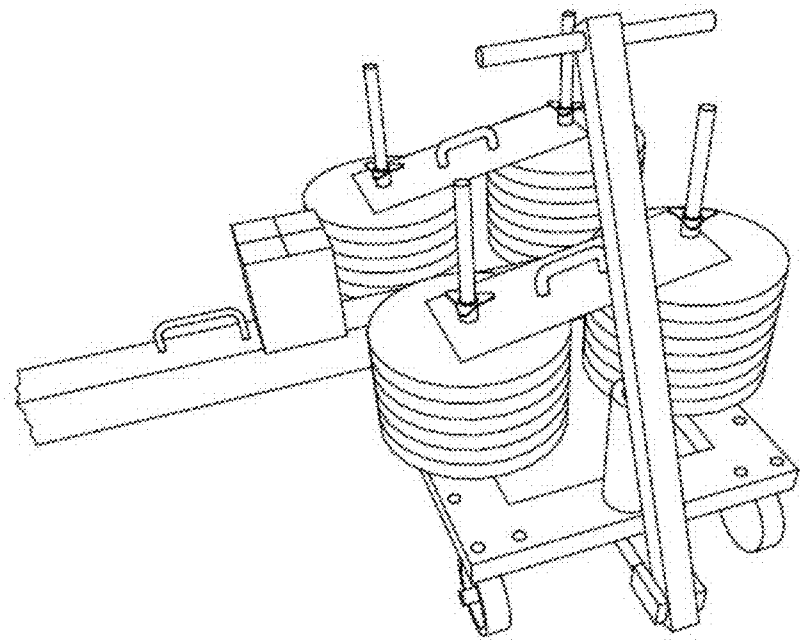
FIG. 3 shows a portion of the counterweight hire system of FIG. 1.

The user can secure their harness to a lanyard or other safety mechanism before entering the elevator pit or walking on the pit deck. For example, a lanyard can be lowered from the anchoring floor (e.g., the floor above the first floor) containing a counterweight hire system (an anchoring system), as shown in FIGS. 1, 2, and 3 and attach the lanyard harness per the safety guidelines.

The user can then close the landing doors, utilize the pit deck device to reach the pit ladder, and descend the pit ladder into the elevator pit. As desired, the pit deck device 400 can be lowered or raised, such as by use of pit deck controls (e.g., remote or physical switch at the pit deck), and this can allow for the user to access and work in shallower pits.

Once the user wishes to complete pit access, the user can use the pit ladder to ascend the elevator hoistway onto the pit deck device 400, open the landing doors, and position themselves on the landing sill. Subsequently, the user can close the landing doors to a distance apart (e.g., 100 cm apart), and then trigger the pit deck device to fold back into its stored position, via the use of a remote control or the key switch located in the hallways, external to the elevator, or by setting a virtual pit deck switch in a software application in the "down" direction. Other means of pit deck device 400 control can be used. As the pit deck device 400 folds back to its stored position, a red flashing light flashes, and and alarm sounds, according to some embodiments. Lights 412 can be configured at a location other than as shown in FIG. 4, according to various embodiments. When the pit deck device 400 is in its stored position, the red flashing light is replaced by a flashing green light to signal to the user to return the elevator from hoistway access mode to its regular operation mode.

In some embodiments, such as for operations where more than one user is desirable, the pit deck device 400 can be restored (put into its operational mode) and the elevator lowered for maintenance such as on roller guides or safety gear.

In some embodiments, pit deck device 400 mitigates potential safety issues by providing safer access to the pit ladder for the users; reduces potential safety issues for the public; allowing for key operation and an ability to provide audible and/or visual feedback to the operator; having safety mechanisms to disable the elevator connected; providing handrails while in a working position; and providing lighting. In some embodiments, pit deck device 400 has an increased case of use and is a self-contained unit, is user friendly, can be remote controlled, and can be operated from within the pit and/or a hall key switch. In some embodiments, pit deck device reduces costs and does not require expensive storage or space in a building and can operate on a low voltage (e.g., 24 volts). In some embodiments, pit deck device 400 reduces the labour and number of users needed.

For example, pit deck device 400 can be operated by only one user in order to access a pit ladder and the pit, allowing for fewer people to be needed to complete the job under safe conditions.

In some embodiments, pit deck device 400 can be used and interoperate with other devices and in other use cases other than deep pit access in an elevator. As used herein, a pit deck device 400 can be referred to as a deck device with modification such as to allow the deck device to operate similarly in a use case other than in the use case described.

In some embodiments, pit deck device 400 further includes a secondary retractable platform configured below the platform 408. This secondary platform is configured to be manually activated by elevator mechanics. The secondary platform is spring loaded to move in the up direction and manually deactivated such as with a steel push bar or rod. The secondary platform is operably connected to a safety switch that is configured to disable the elevator in the up position. This secondary platform is configured to aid in the initial assembly and provide safe access to elevator mechanics for regular maintenance and repairs. The secondary platform is not included in some embodiments. For example, the secondary platform may be used in deep pits (e.g., 10 feet to 25 feet). Most elevator companies have a no ladder policy in place whether it is working in pits or on top of the elevator. Such policies do not provide for a solution. The secondary platform is configured to provide a safe mechanism for facilitating maintenance. For example, the secondary platform can be used to facilitate installations, maintenance, repairs, and inspections by the TSSA.

Various embodiments have been described in detail. Changes in and or additions may be made.

What is claimed is:

1. A deck device for supporting a person in an elevator shaft, the pit deck device comprising:

a platform configured to be pivotably attached to an elevator pit wall of the elevator shaft, a first side of the platform including at least one hinge to connect the platform to an edge of an elevator sill on the elevator pit wall; and at least one actuator attached at a first end to a second side of the platform opposite the first side of the platform, a second end of the at least one actuator being configured to be attached to the elevator pit wall;

wherein;

the platform is configured to pivot between a stored position and an operational position, the stored position being a position whereby the pit deck device is retracted towards the elevator pit wall and a top face of the platform is along a vertical plane with the first side of the platform vertically above the second side of the platform, and the operational position being a position whereby the at least one actuator is extended and the top face of the platform is along a horizontal plane.

2. The deck device of claim 1, wherein:

in the operational position, the platform connects the elevator sill and the elevator pit wall, the elevator pit wall having a pit ladder accessible by the deck device when the platform is in the operation position, and in the stored position, the platform functions as an elevator fascia covering the pit ladder.

3. The deck device of claim 1, wherein the platform may be remotely operated to pivot between the stored position and the operational position.

4. The deck device of claim 1, wherein remote activation of the deck device disables operation of an elevator car corresponding to the elevator hoistway.

5. The deck device of claim 1, further comprising:

at least one light positioned at a perimeter of the platform; and at least one guardrail positioned at the perimeter of the platform.

* * * * *